United States Patent [19]
Holden

[11] 3,913,622
[45] Oct. 21, 1975

[54] GAS CONDUIT AND METHOD OF MAKING SAME

[75] Inventor: Homer N. Holden, Sylva, N.C.; Morris Shokler; Sidney K. Lamden, both of Dayton, Ohio

[73] Assignee: Dayco Corporation, Dayton, Ohio

[22] Filed: Oct. 19, 1973

[21] Appl. No.: 408,023

[52] U.S. Cl. .................. 138/121; 138/177; 181/41
[51] Int. Cl. ........................ F16l 11/10; F16l 11/12
[58] Field of Search ........... 138/121, 122, 177, 178; 181/35 C, 36 B, 41

[56] References Cited
UNITED STATES PATENTS

| | | | |
|---|---|---|---|
| 713,560 | 11/1902 | Dodge | 138/121 |
| 2,029,424 | 2/1936 | Hill | 138/177 |
| 3,374,856 | 3/1968 | Wirt | 138/121 X |
| 3,605,817 | 9/1971 | Bauman et al. | 138/122 X |
| 3,640,312 | 2/1972 | Bauman et al. | 138/121 |
| 3,731,711 | 5/1973 | Bauer | 138/178 |

Primary Examiner—John W. Huckert
Assistant Examiner—Charles Gorenstein
Attorney, Agent, or Firm—Reuben Wolk

[57] ABSTRACT

A gas conduit and method of making the same is provided wherein the conduit has a plurality of axially spaced convolutions defined as an integral part thereof and has a roughened interior surface defined by a plurality of substantially axially extending grooves in the conduit. The roughened interior surface is particularly adapted to provide quieter gas flow through the conduit by breaking up gas flow patterns caused by the convolutions and which patterns would ordinarily tend to produce undesirable noise levels and chiming.

7 Claims, 7 Drawing Figures

U.S. Patent   Oct. 21, 1975   3,913,622

GAS CONDUIT AND METHOD OF MAKING SAME

BACKGROUND OF THE INVENTION

Conduits such as conduits made of elastomeric materials and having integral convolutions, which may be in the form of either annular or helical convolutions, are in wide use throughout industry; and, these conduits usually have comparatively smooth inside surfaces. It has been found that in applications where a gas, such as air, is conveyed through one of these conduits at a comparatively high flow rate there is a tendency for the convolutions of the hose and its smooth inside surface to cooperate and produce undesirable noises, including, in many instances, an undesirable loud chiming effect. It is believed that this chiming effect is produced at the high flow rates because the convolutions with their smooth inside surfaces define resonating cavities.

SUMMARY

This invention provides a gas conduit and method of making same wherein the conduit is particularly adapted to convey gas, such as air, at comparatively high flow rates yet substantially silently; and, the conduit employs a roughened interior surface which is defined by a plurality of substantially axially extending grooves and the roughened interior surface is particularly adapted to provide gas flow through the conduit by breaking up gas flow patterns caused by the convolutions and which patterns would ordinarily tend to produce undesirable noise levels and chiming.

Other, details, uses, and advantages of this invention will be readily apparent from the embodiments thereof presented in the following specification, claims, and drawings.

BRIEF DESCRIPTION OF THE DRAWING

The accompanying drawings show present preferred embodiments of this invention, in which.

DESCRIPTION OF ILLUSTRATED EMBODIMENTS

Figures 1, 2:
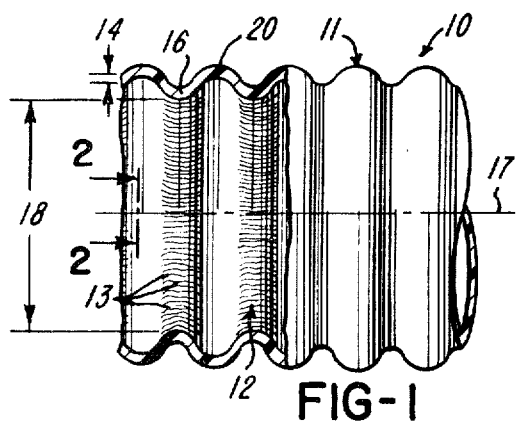
FIG. 1 is a fragmentary view of one exemplary embodiment of a gas conduit of this invention with parts in elevation and parts in cross section.
FIG. 2 is a cross-sectional view taken essentially on the line 2—2 of FIG. 1.

Reference is now made to FIG. 1 of the drawing which illustrates one exemplary embodiment of a gas conduit of this invention which is designated generally by the reference numeral 10. The conduit 10 is made of an elastomeric material and has a plurality of axially spaced annular convolutions as indicated at 11 defined as an integral part thereof and has a roughened interior surface 12 defined by a plurality of substantially axially extending grooves each designated by the reference numeral 13, also see FIG. 2. The roughened interior surface is particularly adapted to provide quieter gas flow through the conduit 10 by breaking up gas flow patterns caused by the convolutions and which patterns would ordinarily (if the inside surface were to be smooth) tend to produce undesirable high noise levels and high intensity chiming both at a decibel level which would be uncomfortable to the human ear if exposed for prolonged periods thereto. The roughened interior surface 12 is particularly effective in providing quieter gas flow through the conduit at high flow rates such as the maximum design flow rate for a particular size conduit.

The conduit 10 may be made of any suitable elastomeric material and although it has an undulating or convoluted configuration, it preferably has a substantially uniform wall thickness 14 throughout. In addition, the substantially axially extending grooves 13 are in the form of striae which are provided in a substantially random manner and each of such striae has a depth 15, as shown in FIG. 2, which is a small fractional part of the wall thickness 14 of the conduit 10.

The convolutions 11 include inwardly (toward the central axis 17 of the hose) extending portions 16 which have inwardly convex semitoroidol configurations which define the minimum diameter 18 of the hose; and, outwardly extending portions 20 which have outwardly convex semitoroidol configurations. As will be apparent from FIG. 1 of the drawing, the striae 13 are provided primarily on the inwardly extending portions 16, although such striae could be provided on practically the entire inside surface of the conduit 10.

Figure 3:
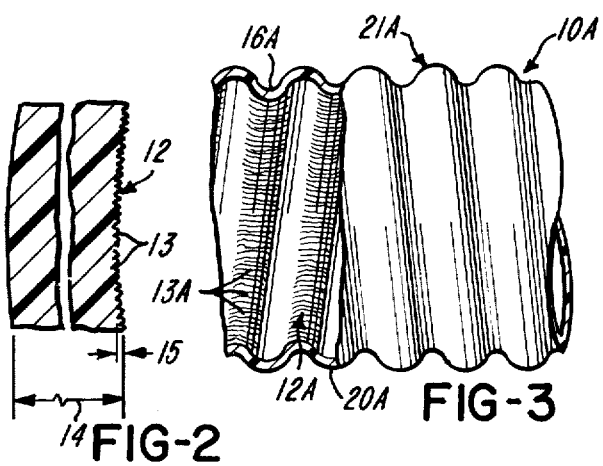
FIG. 3 is a view similar to FIG. 1 illustrating another exemplary embodiment of a gas conduit of this invention.

Another exemplary embodiment of the conduit of this invention is illustrated in FIG. 3. The conduit illustrated in FIG. 3 is very similar to the conduit 10 and therefore such conduit will be designated by the reference numeral 10A and representative parts of the conduit 10A which are similar to the corresponding parts of the conduit 10 will be designated in the drawing by the same reference numeral as in the conduit 10 followed by the letter designated A and not described again in detail. Only those component portions of the conduit 10A which are different from corresponding portions of the conduit 10 will be designated by a new reference numeral also followed by the letter designation A and described in detail.

The conduit 10A is also made of an elastomeric material and also has a plurality of axially spaced convolutions defined as an integral part thereof; however, such convolutions are in the form of helical convolutions as indicated at 21A. The helical convolutions include inwardly extending reduced diameter portions 16A and outwardly extending portions 20A; and, the conduit 10A has a roughened interior surface 12A which is defined by a plurality of substantially axially extending grooves in the form of striae 13A. The striae 13A are also arranged in a substantially random manner and are provided primarily in the inwardly extending portions 16A.

Figure 4:
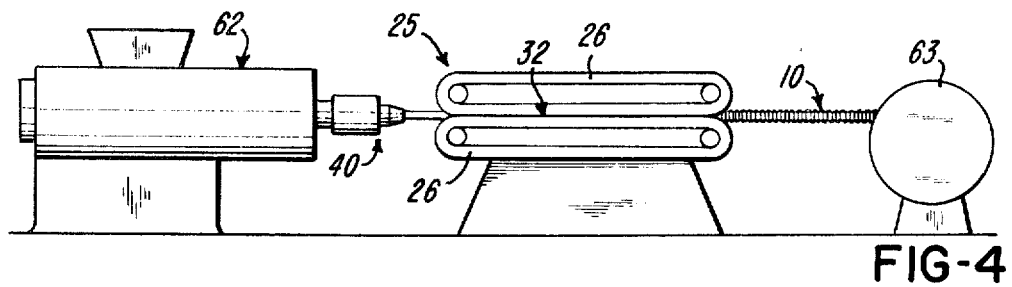
FIG. 4 is a schematic view illustrating one exemplary embodiment of the method of this invention and an apparatus which may be utilized in carrying out such method.
Figure 5:
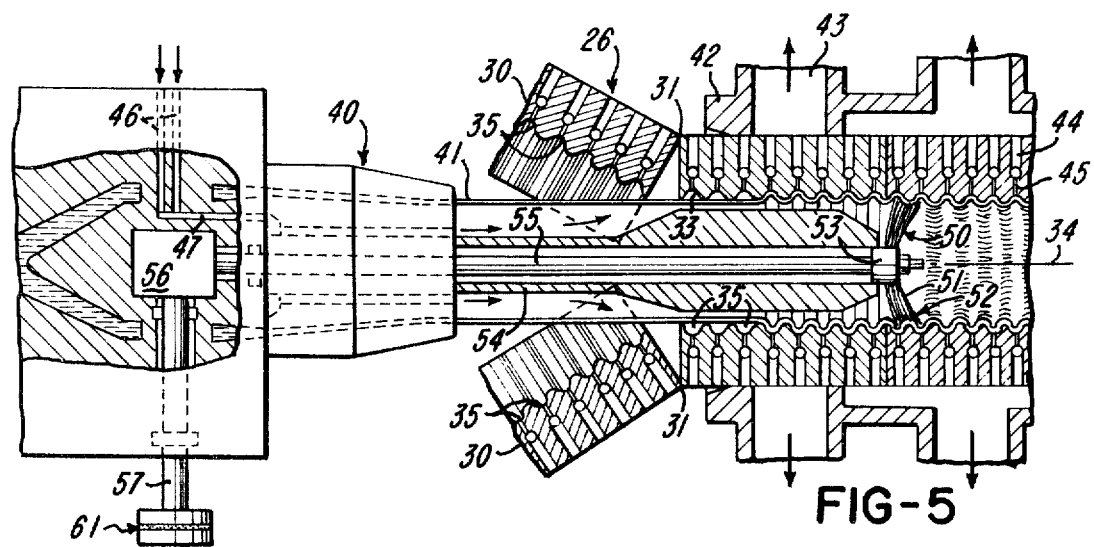
FIG. 5 is an enlarged fragmentary cross-sectional view particularly illustrating the manner in which the inside surface of the conduit of FIG. 1 may be roughened with a roughening instrument in the form of a wire brush.

Having described the exemplary conduits 10 and 10A of this invention, a detailed description will now be presented of the improved method of this invention which is used to make such conduits and a typical apparatus which may be utilized in carrying out such method and for this description particular reference is made to FIGS. 4 and 5 of the drawing. The apparatus and method illustrated in FIGS. 4 and 5 is designated generally by the reference numeral 25; and, it will be seen that a pair of mold devices 26 are provided and suitably supported in a known manner for movement in a pair of endless paths which have a common rectilinear portion 32. Each device 26 is moved in a similar manner as a so-called crawler tread. The apparatus 25 utilized to form a convoluted hose in a continuous manner is similar to the apparatus disclosed in U.S. Pat. No. 3,538,209 to Hegler.

Each mold device 26 is comprised of a plurality of mold halves 30 which are suitably pivotally fastened together as indicated at 31 and as the mold halves are moved by their devices 26, they define what may be considered a moving housing having the rectilinear portion 32 which defines an undulating tubular surface 33 which has a central axis 34. A plurality of grooves 35 are provided in each mold half and in the rectilinear portion 32 the grooves 35 extend in a direction radially away from the axis 34. The grooves 35 in the mold halves 30 cooperate to define the undulating tubular surface 33 during movement thereof along the common rectilinear portion 32, whereby the undulating surface 33 is employed to define the convolutions or undulations 11 in the hose 10.

The apparatus 25 has a die 40 of known construction for extruding molten elastomeric material therethrough to define a tubular parison 41 and has means for urging the plastic parison against the undulating tubular surface 33 to define the convolutions 11 in the conduit 10. The urging means may be of any suitable means for exerting a force against the tubular parison and urging it into the undulating tubular surface. In this example, vacuum means is provided and comprises a vacuum pump (not shown) suitably connected by a connector 42 which uses the usual sliding seals to the mold halves 30 along the common rectilinear portion 32 and a passage 43 in the connector 42 is in fluid flow communication with the vacuum pump. The passage 43 communicates with the grooves 35 by means of a plurality of sets of interconnected passages 44 and 45 extending through each mold half 30.

The apparatus 25 also has cooperating passages 46 and 47 therein which allow the inside of the parison to be at the same pressure as the normal atmospheric pressure where the apparatus 25 is being employed. Thus, once the tubular parison 41 is extruded into the rectilinear portion 32 vacuum is applied through passages 43, 44, and 45 whereupon atmospheric pressure through passages 46 and 47 urges the molten parison against the undulating tubular surface 33 and defines the integral convolutions therein having the inwardly extending portions 16.

The method of this invention includes the step of relatively moving a roughening instrument and the conduit to define the axially extending grooves or striae on the inside surface of the conduit 10 and the relatively moving step in this disclosure of the invention is achieved by holding a roughening instrument 50 at a substantially stationary position within the undulating tubular surface 33 while moving the conduit thereacross and in particular the reduced diameter portions 16 across and against the roughening instrument 50 and such roughening instrument engages and roughens the inside surface and defines the grooves or striae 13 therein. The forming of the grooves 13 is achieved comparatively easily with minimum forces being imposed on the apparatus because of the semi-soft condition of the parison inasmuch as such parison has not completely solidified because it is still hot.

The roughening instrument 50 may be of any suitable form and in this example, is in the form of a disc-like circular wire brush having a plurality of radially extending individual resilient metal wires 51. The wires 51 are adapted to be deflected as illustrated at 52 once the reduced diameter portions 16 engage the terminal end portions of such wires and once each reduced diameter portion moves past the end portions of the wires 51 the wires return to their original positions.

The wire brush 50 may be held at a fixed axial position within the undulating tubular surface 33 and held in a bearing 53 in a non-rotating manner. The bearing 53 is fixed to an extension 54 of the extrusion die 40. If desired a rotatable drive shaft 55 may be provided through the die 40 and suitably connected to the brush 50 at one end and by gears 56 to a rotatable cross shaft 57 which may be driven by a motor 60 through a disengageable clutch 61.

Preferably the wire brush 50 is supported in its bearing 53 without using the shafts 55 and 57, gears 56 and motor 60; and, with this latter arrangement the grooves or striae 13 are provided substantially longitudinally along the length of the conduit, although such striae are not necessarily in parallel relation with the axis 34. Further, such striae are essentially provided in a random manner as determined by the random distribution of the individual wires of the wire brush. It will also be appreciated that striae 13 may be provided on substantially the entire surface of the conduit 10 by making the wires 51 longer so that they may also engage the inside surfaces of portions 20 of the conduit 10.

The elastomeric material used to make tube 11 is in the form of a molten elastomeric material which is provided under heat and pressure conditions from an extrusion apparatus of known conventional construction and designated generally by the reference numeral 62. After the conduit 10 exits the mold devices 26 it may be cut into desired lengths using a suitable cutting apparatus; however, in this disclosure, the conduit 10 is wound or coiled using a windup mechanism 63.

Figure 6:
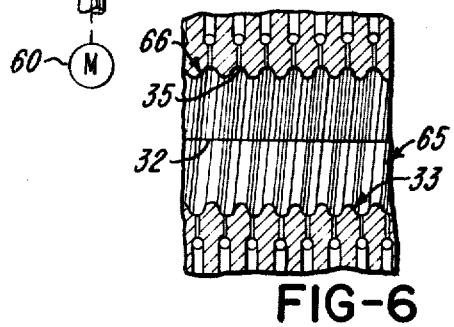
FIG. 6 is a fragmentary view illustrating portions of a pair of mold devices which may be used interchangeably with the mold devices illustrated in FIGS. 4 and 5.

The hose 10A may be made utilizing the basic apparatus and method 25 merely by modifying the mold devices thereof and portions of such modified mold devices are shown in FIG. 6 of the drawing and each designated by the reference numeral 26. Each mold device 26 of FIG. 6 has grooves 35 in each of its mold halves 26 suitably changed in configuration as shown at 65 so that once the cooperating mold halves 26 move along the common rectilinear portion 32 the tubular surface 33 has a continuous helical groove designated generally by the reference numeral 66 defined therein whereby once the elastomeric material from the extruder is introduced through the die 40 and vacuum exerted against the resulting parison the conduit 10A is defined having convolutions therein which extend in a substantially helical pattern as defined by the helical groove 66. The roughened instrument or wire brush 50 is used as before to define grooves or striae 13A in the inwardly extending portions 16A of the conduit 10A.

Figure 7:
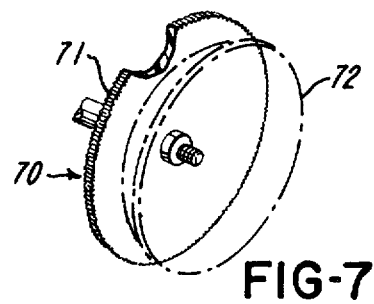
FIG. 7 is a perspective view of another type of roughening instrument which may be used in lieu of the roughening instrument of FIG. 5.

It will also be appreciated that instead of utilizing a roughening instrument 50 in the form of a wire brush as shown in FIG. 5, a disc-like roughening instrument may be utilized and as illustrated in FIG. 7 and such instrument is designated by the reference numeral 70. The roughening instrument 70 may be made of a suitable bendable resilient elastomeric material and has a plurality of sawtoothed edges 71 therein which define grooves or striae in an associated convoluted hose which may be similar to the grooves or striae 13 and 13A respectively of the conduits 10 and 10A respectively. The instrument 70 may be used interchangeably with the wire brush 50 and is supported in a similar manner; and, the instrument 70 is bendable from its solid line configuration to a configuration shown by the dotted lines 72 as its edges 71 engage portions 16 of conduit 10, for example.

The depth of each groove or striae in the conduit or hose of this invention such as the conduit 10, for example, is substantially less than the wall thickness 14 of the convoluted conduit. Preferably each groove or striae is a small fractional part of such wall thickness and generally of the order of one-twentieth of such wall thickness. However, it will be appreciated that the depth of each groove or striae may be varied depending upon the application of the conduit, the pressure of the gas to be carried within the conduit, and the elastomeric material used.

Any suitable elastomeric material may be used in making the improved gas conduit of this invention and such elastomeric material may be in the form of a natural or synthetic rubber compound or a suitable polymer, such as, a high molecular weight polymer, for example.

The gas conduit of this invention has many applications; however, such conduit is very effective in conveying air for vacuum cleaner hose applications.

While present exemplary embodiments of this invention, and methods of practicing the same, have been illustrated and described, it will be recognized that this invention may be otherwise variously embodied and practiced within the scope of the following claims.

What is claimed is:

1. A flexible conduit composed of a single elastomeric tubular member having a smooth continuous outer surface and a roughened inner surface; said conduit having external and internal convolutions comprising alternating crests and troughs, the crests and troughs of the outer surface corresponding to the troughs and crests of the inner surface; said inner surface characterized by a plurality of substantially axially extending grooves; said conduit having a substantially uniform wall thickness, said grooves extending into said inner surface in an amount constituting only a small fractional portion of said wall thickness.

2. The conduit of claim 1 in which said convolutions are annular.

3. The conduit of claim 1 in which said convolutions are helical.

4. The conduit of claim 1 in which the depth of said grooves is approximately one-twentieth of the depth of said wall thickness.

5. The conduit of claim 1 in which said grooves are arranged in a random manner.

6. The conduit of claim 1 in which said grooves are located primarily on said internal crests.

7. The conduit of claim 1 in which said grooves are located on practically the entire inner surface.

* * * * *